United States Patent
Mathew et al.

(10) Patent No.: US 10,367,725 B2
(45) Date of Patent: Jul. 30, 2019

(54) NETWORK PROGRAMMING

(71) Applicant: HEWLETT PACKARD ENTERPRISE DEVELOPMENT LP, Houston, TX (US)

(72) Inventors: Subin Cyriac Mathew, Bangalore (IN); Sugesh Chandran, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 356 days.

(21) Appl. No.: 15/106,960

(22) PCT Filed: Jan. 29, 2014

(86) PCT No.: PCT/US2014/013504
§ 371 (c)(1),
(2) Date: Jun. 21, 2016

(87) PCT Pub. No.: WO2015/094388
PCT Pub. Date: Jun. 25, 2015

(65) Prior Publication Data
US 2017/0005916 A1    Jan. 5, 2017

(30) Foreign Application Priority Data

Dec. 21, 2013   (IN) ........................... 5971/CHE/2013

(51) Int. Cl.
*H04L 12/24*    (2006.01)
*H04L 12/721*   (2013.01)

(52) U.S. Cl.
CPC .............. *H04L 45/38* (2013.01); *H04L 41/12* (2013.01)

(58) Field of Classification Search
CPC ....................................................... H04L 45/38
See application file for complete search history.

(56) References Cited

U.S. PATENT DOCUMENTS 6,449,256 B1   9/2002   Varghese et al.
8,223,951 B1   7/2012   Edelhaus et al.
(Continued)

FOREIGN PATENT DOCUMENTS

WO   WO-2013/099080 A1   7/2013

OTHER PUBLICATIONS

International Search Report and Written Opinion, International Application No. PCT/US2014/013504, dated Sep. 22, 2014, pp. 1-10.
(Continued)

*Primary Examiner* — Christopher P Grey
(74) *Attorney, Agent, or Firm* — Hewlett Packard Enterprise Patent Department (57) ABSTRACT

In one implementation, a network controller includes a path analysis module, an instruction module, and a distribution module. The path analysis module defines a data path including a plurality of network devices for a flow within a network in response to a data path request from a network device. The instruction module generates a first message including an instruction to establish a first forwarding rule at a first network device, and a second message including a first instruction to establish a second forwarding rule at a second network device and a second instruction to establish a third forwarding rule at a third network device. The distribution module provides the first message to the first network device and the second message to the second network device.

18 Claims, 9 Drawing Sheets

(56) References Cited

U.S. PATENT DOCUMENTS

| | | | |
|---|---|---|---|
| 9,379,981 B1* | 6/2016 | Zhou | H04L 47/125 |
| 2004/0233855 A1 | 11/2004 | Gutierrez et al. | |
| 2006/0182082 A1* | 8/2006 | Wakumoto | H04L 41/0806 |
| | | | 370/351 |
| 2007/0213077 A1 | 9/2007 | Mian et al. | |
| 2009/0138577 A1 | 5/2009 | Casado et al. | |
| 2010/0034200 A1 | 2/2010 | Melampy et al. | |
| 2012/0113989 A1* | 5/2012 | Akiyoshi | H04L 45/02 |
| | | | 370/392 |
| 2012/0120808 A1* | 5/2012 | Nandagopal | H04L 45/025 |
| | | | 370/238 |
| 2012/0281575 A1 | 11/2012 | Iwata et al. | |
| 2013/0028070 A1 | 1/2013 | Beheshti-Zavareh et al. | |
| 2013/0235869 A1 | 9/2013 | Akiyoshi | |
| 2013/0329548 A1 | 12/2013 | Nakil et al. | |
| 2014/0198662 A1* | 7/2014 | Shimizu | H04L 45/122 |
| | | | 370/238 |
| 2014/0241368 A1* | 8/2014 | Suzuki | H04L 12/66 |
| | | | 370/392 |
| 2014/0307742 A1* | 10/2014 | Koide | H04L 12/4633 |
| | | | 370/400 |
| 2014/0325038 A1* | 10/2014 | Kis | H04L 41/0803 |
| | | | 709/220 |
| 2015/0180769 A1* | 6/2015 | Wang | H04L 45/38 |
| | | | 370/236 |
| 2016/0028589 A1* | 1/2016 | Devarajan | H04L 41/12 |
| | | | 370/249 |
| 2016/0036644 A1* | 2/2016 | Devarajan | H04L 12/462 |
| | | | 370/254 |
| 2016/0099874 A1* | 4/2016 | Hu | H04L 12/6418 |
| | | | 370/236 |
| 2017/0134275 A1* | 5/2017 | Ni | H04L 45/74 |

OTHER PUBLICATIONS

Sachin Sharma et al., "Enabling Fast Failure Recovery in Openflow Networks," Jun. 30, 2011, pp. 1-8.

* cited by examiner

NETWORK PROGRAMMING

BACKGROUND

Software-defined networking is an approach to communications networks in which network devices communicate with a network controller to determine which data paths network flows should propagate through a communications network. Communications networks that use software-defined networking techniques are referred to as software-defined networks (SDN).

Typically, a network device within an SDN sends a data path request to a network controller when a new network flow is detected or when that network device does not have a forwarding rule for handling a network flow. The network controller determines which forwarding rules should be established at that network device and other network devices to establish a data path for that network flow. The network controller then sends a message to each network device within that data path.

The messages provided to each network device within the data path include an instruction that is used by that network device to establish a forwarding rule for the network flow. In other words, the network controller programs the network devices to define the data path for the network flow. After the forwarding rules are established at each network device within that data path, the network flow (e.g., information within data packets of the network flow) propagates through the SDN along the data path.

DETAILED DESCRIPTION

Software-defined networking can simplify network management and allow more rapid implementation of functionalities and capabilities into communications networks (also referred to herein as networks). However, a network controller (also referred to herein as a controller) within an SDN can spend a significant amount of time programming each network device within a data path for a network flow (also referred to herein as a flow). That is, the process of providing an instruction to establish a forwarding rule within each network device in the data paths for many flows can consume resources of a controller for significant periods of time. Furthermore, the burden placed by a controller on a network (e.g., the communications links and network devices) to provide instructions to network devices within data paths for flows can be substantial.

Implementations discussed herein describe systems and methodologies to program network devices within an SDN without a controller that provides instructions to each of those network devices. For example, some systems and methodologies described herein include a controller that defines a data path for a flow and provides instructions to establish forwarding rules at multiple network devices within that data path to one network device within that data path. That network device provides or propagates the instructions to establish forwarding rules at other network devices to the other network devices along the data path. Thus, the controller does not send the instructions to each network device within that data path.

Figure 1A:
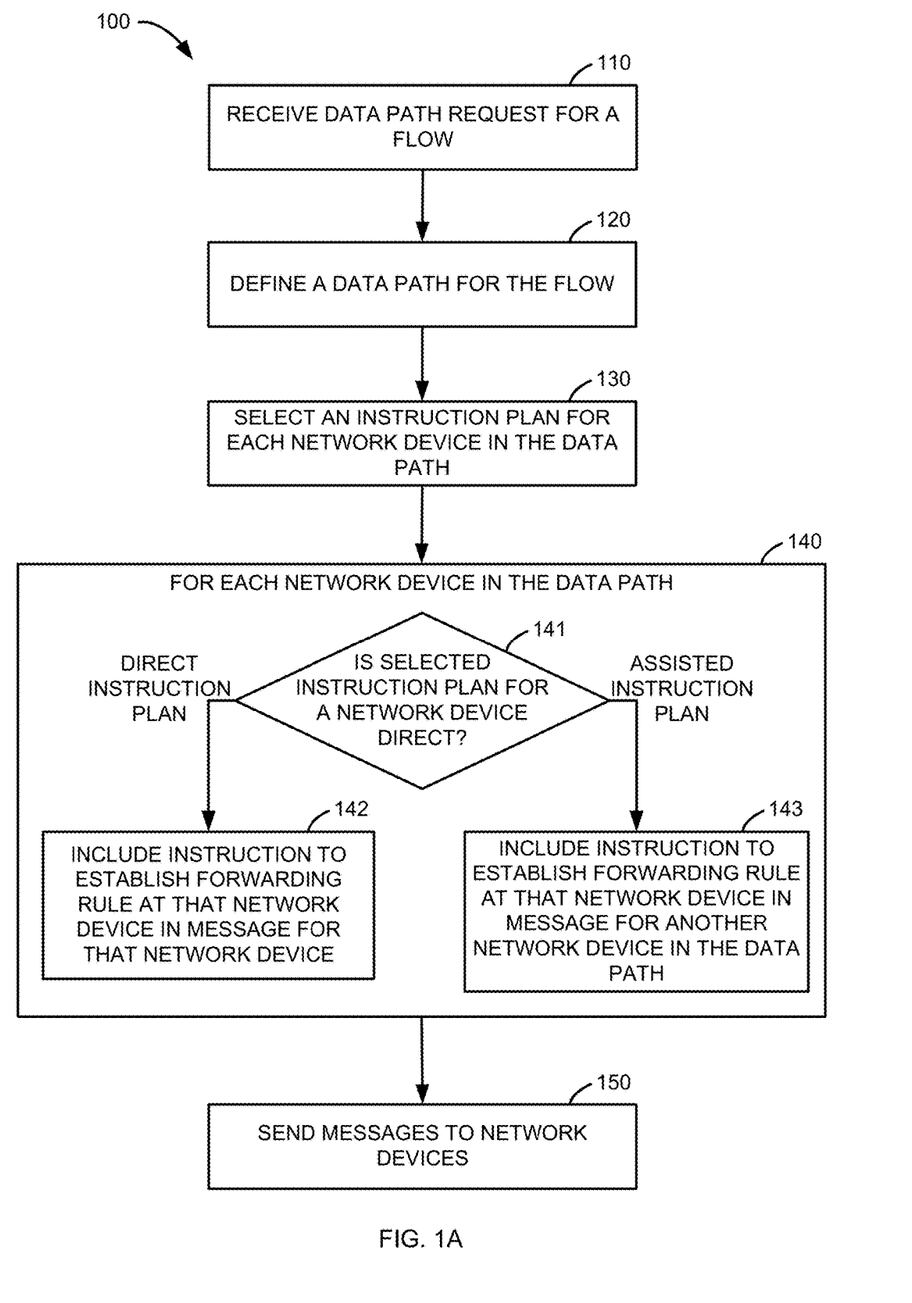
FIG. 1A is a flowchart of a network programming process, according to an implementation.

FIG. 1A is a flowchart of a network programming process, according to an implementation. Network programming process 100 can be implemented or realized at a variety of hosts. For example, process 100 can be implemented at a computing system such as a service configured as a controller within an SDN. Such a computing system can be referred to as a controller (or SDN controller). Additionally, functionalities or actions described herein as being performed by process 100 should be understood to be performed by a host (e.g., a controller) implementing process 100.

A data path request for a flow is received from a network device at block 110, and a data path is defined for that flow at block 120. A flow is a set of related data such as data packets including a common source (e.g., described by a host name, address, or other identifier) and a common destination (e.g., described by a host name, address, or other identifier). A data path for (or associated with) a flow is a set of network devices through which a flow propagates between a source of the flow (e.g., computing systems from which the flow is provided) and a destination of the flow (e.g., computing systems to which the flow is provided). A data path request is a request from a network device (e.g., a switch, a router, a bridge, a gateway, or an access point such as a wireless access point) for instructions that describe how a flow should be forwarded (e.g., switched, routed, or otherwise processed within a network device) by that network device.

For example, the network device can receive a data packet that is not associated with any flow (or forwarding rule corresponding to a flow within a forwarding table of the network device) currently forwarded by the network device. Said differently, the network device can receive a data packet for a flow the network device is not programmed to handle. In response to determining that the network device is not programmed to handle the new flow including the data packet, the network device can send a message including the data path request to a controller implementing process 100. That controller receives the data path request at block 110 and then defines a data path for the flow using, for example, topology, capacity, utility, and other information about network devices within a network at block 120.

Process 100 then selects an instruction plan for each network device in the data path at block 130. An instruction plan is an approach via which a controller provides instructions to a network device. Moreover, an instruction plan can be direct (e.g., a direct instruction plan) or assisted (e.g., an assisted instruction plan). A direct instruction plan is an instruction plan for which a controller and a network device are endpoints (e.g., the source and the destination), and may be logical or physical. For example, a logical connection that may extend through multiple network devices such as a Transmission Control Protocol (TCP) connection between a controller and a network device can be a direct instruction plan between a controller and a network device.

In other words, a direct instruction plan is an instruction plan for which a controller and a network device are addressed endpoints. That is, according to a direct instruction plan, a controller sends instructions to a network device via a link between the controller and the network device. As a specific example, such a link can be an OpenFlow® control channel between the controller and the network device.

An assisted instruction plan is an instruction plan for which an intermediate network device is an intermediate endpoint between a controller and a network device. In some implementations, the intermediate network device is another network device within a data path for a flow, for which the instruction to be provided according to the instruction plan establishes a forwarding rule. In other words, an assisted instruction plan includes two portions (e.g., links), which may be logical or physical. One portion has the controller and the intermediate network device as endpoints, and the other portion has the intermediate network device and the network device as endpoints. For example, an assisted instruction plan between a controller and a network device can include a TCP connection between the controller and an intermediate network device, and a TCP connection between the intermediate network device and the network device. In other implementations, an assisted instruction plan between a controller and a network device can include a TCP connection between the controller and an intermediate network device, and one or more layer 2 (L2) Ethernet frames transmitted from the intermediate network device to the network device.

In other words, in an assisted instruction plan between a controller and a network device, the controller provides instructions to an intermediate network device as an endpoint, and the intermediate network device provides instructions to the network device as an endpoint. Said differently, a controller provides instructions for the network device to the intermediate network device via one link, and the intermediate network device provides those instructions to the network device via another link. As a specific example, the link between the controller and intermediate network device can be an OpenFlow® control channel between the controller and the intermediate network device, and the link between the intermediate network device and the network device can be an L2 Ethernet connection.

An instruction plan can be selected at block 130 for each network device in the data path according to a variety of methodologies. For example, an instruction plan can be selected according to a cost (e.g., use of resources within a network or controller, number of hops in one or more links, Round Trip Time (RTT) of a connection or link, time to provide an instruction, user or system preferences, or other considerations) associated with each of a group of instruction plans.

As a specific example, process 100 can determine whether a cost of providing an instruction along a link between a controller and a network device (e.g., a direct instruction plan) is less than a cost of providing the instruction along a link between the controller and an intermediate network device and another link between the intermediate network device and the network device (e.g., an assisted instruction plan). In other words, process 100 can determine whether a direct instruction plan is more efficient than an assisted instruction plan. If the direct instruction plan is more efficient than the assisted instruction plan, the direct instruction plan can be selected. Alternatively, if a cost of providing the instruction along the link between the controller and the network device is greater than the cost of providing the instruction along the link between the controller and the intermediate network device and another link between the intermediate network device and the network device (i.e., the direct instruction plan is less efficient than the assisted instruction plan), the assisted instruction plan can be selected.

Moreover, multiple direct instruction plans and multiple assisted instruction plans can be considered at block 130. For example, multiple links can exist between the controller and a network device, and each link can be considered at block 130 as a direct instruction plan for providing an instruction to that network device. Similarly, for example, multiple assisted instruction plans can exist between the controller and a network device based on multiple links between one or more intermediate network devices, and multiple links between those one or more intermediate network devices and the network device.

After an instruction plan is selected at block 130 for each network device in the data flow defined at block 120, process 100 proceeds to block 140 at which blocks 141 and 142 or 143 are performed for each network device in the data path. At block 141, process 100 determines whether a direct instruction plan was selected at block 130. If a direct instruction plan was selected at block 130, an instruction to establish a forwarding rule to realize the data path at the current network device is included within a message for (or addressed to) the current network device at block 142. In other words, a message including an instruction to establish a forwarding rule to realize the data path at the current network device is generated to be provided to the current network device according to the selected instruction plan (e.g., via a particular link between the controller and the current network device associated with the selected instruction plan).

A forwarding rule is a data set that describes a flow (e.g., characteristics or parameters of a flow) and an action to perform on the flow. For example, a forwarding rule can include a match field that includes a value, pattern, or other data that can be compared with a flow (e.g., fields of data packets of a flow) to determine whether that flow matches the forwarding rule. Additionally, the forwarding rule can include (explicitly or implicitly) an action to perform on the flow. For example, the action can be to forward the flow (or data packets of the flow) to another network device, to drop the flow, to forward the flow to a controller, to modify the flow, and/or otherwise handle the flow. Moreover, the action can be described within the rule as a name or identifier of an operation, as a reference to an operation from list of operations such as an action table, or using some other description. An instruction is a data set that describes some operation to be performed. In some implementations, an instruction includes an identifier of an entity (e.g., a network device) to which the instruction is directed. Additionally, a message is group of data or information that is communicated from one entity to another.

If an assisted instruction plan was selected at block 130, an instruction to establish a forwarding rule to realize the data path at the current network device is included within a message for (or addressed to) an intermediate network device for the selected assisted instruction plan at block 143. In other words, a message including an instruction to establish a forwarding rule to realize the data path at the current network device is generated to be provided to the intermediate network device for the selected assisted instruction plan.

Accordingly, in some implementations, instructions for multiple network devices can be included within a message to one network device. For example, a direct instruction plan can be selected at block 130 for a first network device, and indirect instruction plans in which the first network device is an intermediate network device can be selected at block 130 for a second network device and a third network device. Instructions to establish forwarding rules at the first network device, at the second network device, and at the third network device would therefore be included within the message for the first network device.

Process 100 then proceeds to block 150 at which the messages for the network devices are provided to those network devices. Because assisted instruction plans are selected at block 130 for some network devices, messages are not sent at block 150 to all network devices in the data path defined at block 120. Accordingly, a controller implementing process 100 can avoid consuming time and resources to provide messages with instructions for establishing forwarding rules to each network device in the data path defined at block 120.

Figure 1B:
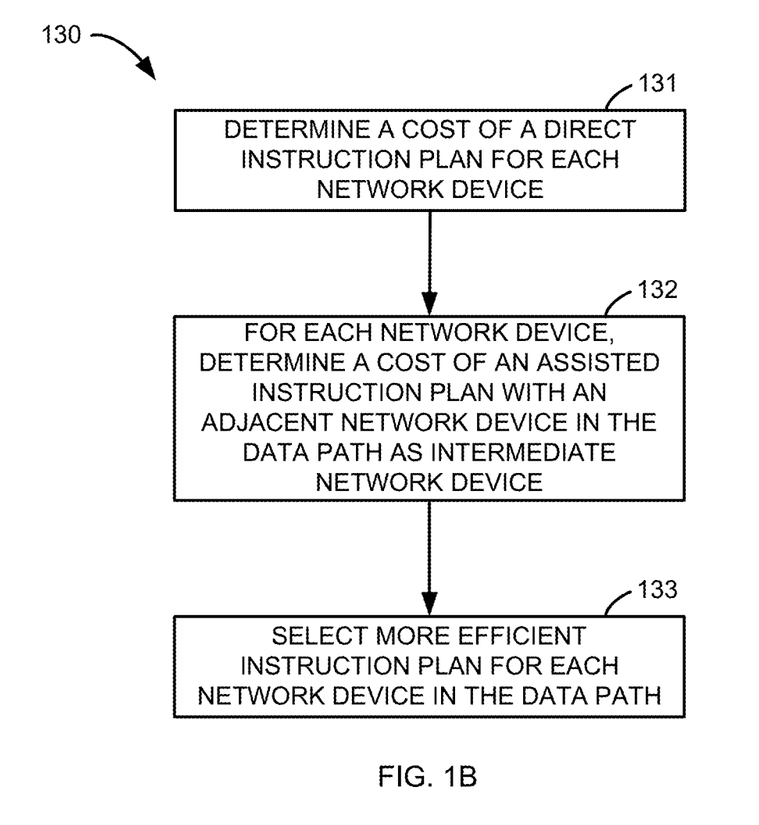
FIG. 1B is a flowchart of a process to select an instruction plan for the network programming process of FIG. 1A, according to an implementation.

Process 100 illustrated in FIG. 1A is an example implementation of a network programming process. In other implementations, a network programming process can include additional, fewer, or rearranged blocks or steps. For example, FIG. 1B is a flowchart of a process to select an instruction plan for the network programming process of FIG. 1A, according to an implementation. In other words, FIG. 1B illustrates a specific example implementation of block 130.

A cost of providing an instruction to establish a forwarding rule to each network device in the data path according to a direct instruction plan for that network device is determined at block 131. For example, the cost of each direct instruction plan for each network device can be calculated at block 131, and the direct instruction plan with the least cost (e.g., most efficient) for that network device can be determined at bock 131.

Similarly, a cost of providing an instruction to establish a forwarding rule to each network device in the data path according to an assisted instruction plan for that network device is determined at block 132. In the example illustrated in FIG. 1 B, assisted instruction plan for each network device includes an adjacent network device in the data path as an intermediate network device. In other words, the data path has an order (e.g., an order of network devices through which a flow propagates through those network devices between a source and a destination), and the assisted instruction plan (or plans) for each network device considered at block 132 includes the preceding or subsequent network device in the data path. For example, for each network device, the cost of the assisted instruction plan including the network device preceding that network device in the data path and the cost of the assisted instruction plan including the network device following that network device in the data path can be calculated at block 132, and the assisted instruction plan with the least cost (e.g., most efficient) for that network device can be determined at bock 132.

At block 133, the instruction plan from the direct instruction plan and the assisted instruction plan for each network device in the data path that is more efficient is selected as the instruction plan for that network device. In other words, the more efficient instruction plan from the direct instruction plan and the assisted instruction plan for each network device is the instruction plan selected at block 130.

Because only assisted instruction plans that include network devices in the data path as intermediate network devices are considered at block 132, all messages generated at block 142 and 143 of process 100 illustrated in FIG. 1A are provided to network devices in the data path. Thus, if the assisted instruction plan determined at block 132 is more efficient than the direct instruction plan determined at block 131 for any network device, process 100 sends fewer messages at block 150 than the number of network devices in the data path.

Figure 2:
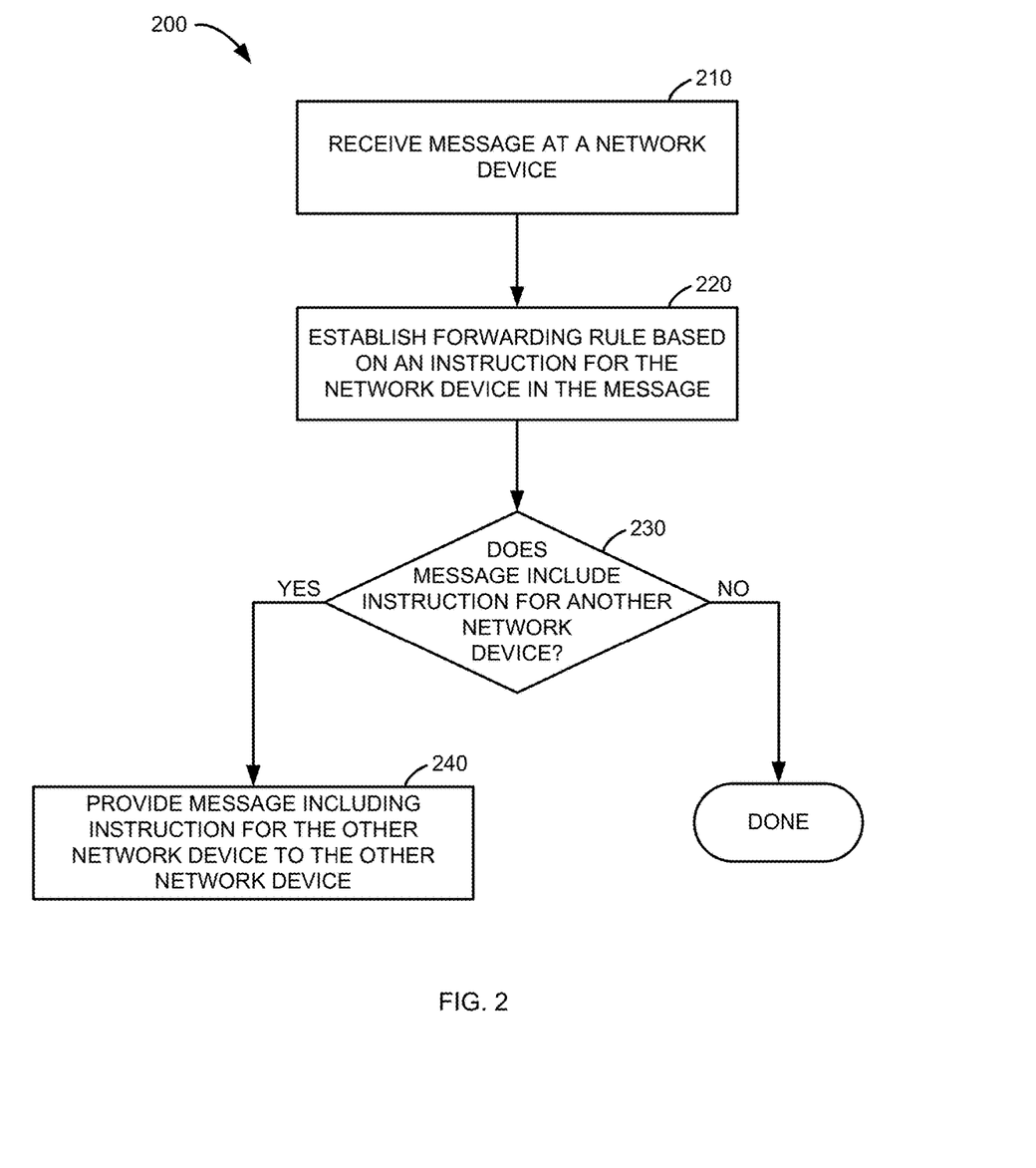
FIG. 2 is a flowchart of a network programming process, according to another implementation.

FIG. 2 is a flowchart of a network programming process, according to another implementation. Network programming process 200 can be implemented or realized at a variety of hosts. For example, process 200 can be implemented at a network device such as a switch within an SDN. Additionally, functionalities or actions described herein as being performed by process 200 should be understood to be performed by a host (e.g., a switch) implementing process 200.

At block 210, a message including an instruction to establish a forwarding rule at a network device is received at that network device. For example, the message can be received from a controller in response to a data path request provided by that network device or another network device. A forwarding rule based on the instruction for that network device is then established at block 220. For example, the forwarding rule can be written to a forwarding table or other component within the network device.

Process 200 then determines at block 230 whether the message includes an instruction for another network device (e.g., an instruction to establish a forwarding rule at the other network device). For example, each instruction can include an identifier (e.g., a host name or an address such as a Media Access Control (MAC) address or Internet Protocol (IP) address) of the network device to which the instruction is directed. Process 200 can determine based on such an identifier or other information such as metadata within the message received at block 210 whether the message includes an instruction for another network device. If the message does not include an instruction for another network device, process 200 completes.

If the message does include an instruction for another network device, process 200 proceeds to block 240 at which a message including that instruction for the other network device is provided to the other network device. Thus, the network device at which the message was received at block 210 is an intermediate network device for the instruction for the other network device. The message can be provided to the other network device via a variety of links. For example, the message can be provided to the other network device as a L2 Ethernet frame along a link between the network device and the other network device.

As discussed above in relation to FIG. 1 B, in some implementations the network device and the other network device are each in a data path for a flow. In such implementations, the network device can immediately precede or follow the other network device in the data path. Moreover, the network device can provide the message to the other network device along a link between the network device and the other network device that will be used for transmitting the flow between the network device and the other network device.

Process 200 illustrated in FIG. 2 is an example implementation of a network programming process. In other implementations, a network programming process can include additional, fewer, or rearranged blocks or steps. For example, although process 200 is illustrated as a sequential process, a network programming process may include blocks or steps that are executed in parallel. As a specific example, a forwarding rule is established based on an instruction at the network device before the instruction for the other network device is provided to the other network device. In other implementations, these steps or operations can be performed in parallel or in the reverse order.

FIGS. 3A-3E are an illustration of network programming within an environment, according to an implementation. The environment illustrated in FIGS. 3A-3E includes communications network (or network) 300 and network clients 381 and 385. A network client is a computing system or application hosted at a computing system that communicates with other network clients via a network. Network 300 includes network controller (or controller) 310 and network devices 321-325 and 331-335. Controller 310, network devices 321-325 and 331-335, and network clients 381 and 385 communicate one with another via links L1, L2, L3, L4, L5, L6, L7, L8, L9, L10, L11, L12, L13, L14, L15, L16, and L17 as illustrated in FIGS. 3A-3E. In other words, two of controller 310, network devices 321-325 and 331-335, and network clients 381 and 385 connected one to another by one of links L1, L2, L3, L4, L5, L6, L7, L8, L9, L10, L11, L12, L13, L14, L15, L16, and L17 can communicate one with another.

Figure 3A:
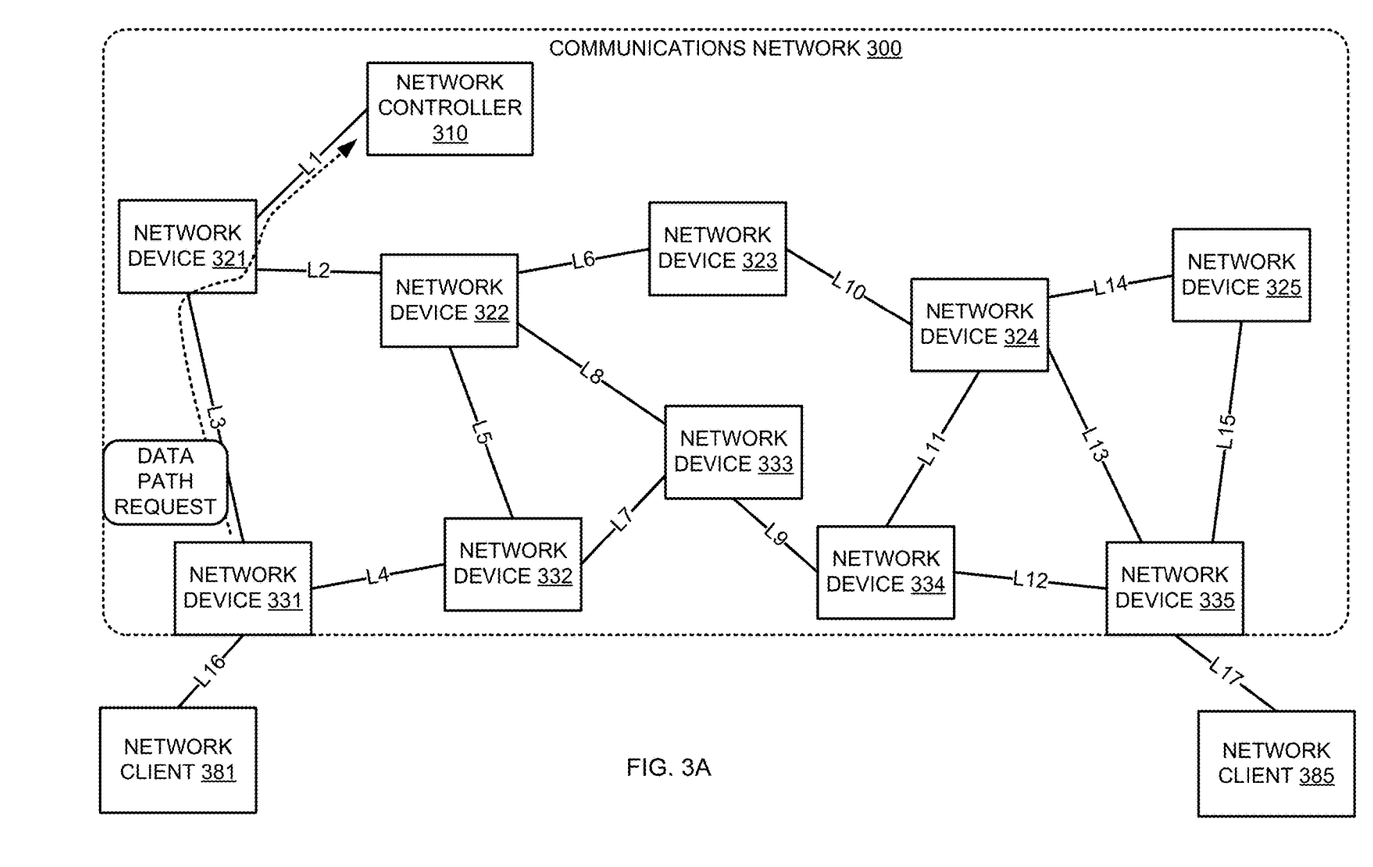
FIGS. 3A-3E are an illustration of network programming within an environment, according to an implementation.

As illustrated in FIG. 3A, a data path request is sent from network device 331 to controller 310. For example, the data path request can be sent in response to a data packet sent to network device 331 by network client 381 that is addressed to network client 385. Network device 331 can determine that it does not include a forwarding rule for a flow corresponding to that data packet, and can send the data path request to controller 310 to request an instruction defining a forwarding rule corresponding to a flow including that data packet.

Controller 310 receives the data path request and defines a data path between network clients 381 and 385. For example, a data path between network clients 381 and 385 is illustrated with broken lines in FIG. 3B. That is, the data path identified by controller 310 includes network devices 331-335. After defining the control path, controller 310 needs to program the network devices in the data path (i.e., provide instructions to establish forwarding rules at each network device).

Figure 3B:
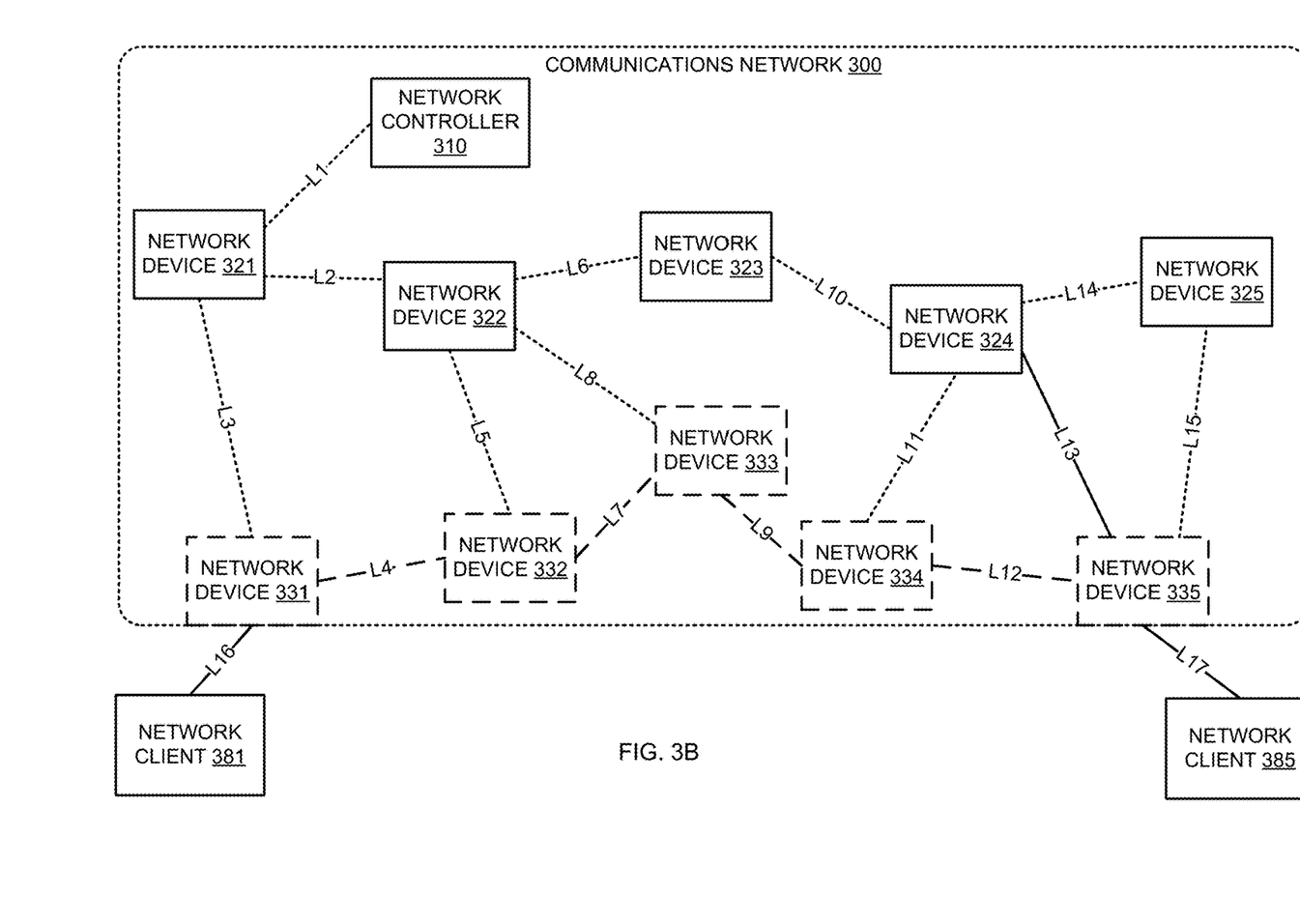

In this example, controller 310 selects an instruction plan for each network device using the number of hops (i.e., number of links) between the controller and each network device as the cost for instruction plans and a network programming process such as those discussed above. Specifically in this example, controller 310 has one logical link (e.g., a TCP connection) with each of network devices 321-325 and 331-335. The links via which the logical links between controller 310 and network devices 321-325 and 331-335 are realized are illustrated in FIG. 3B as dotted lines. In other words, controller 310 has a logical link with network device 321 via link L1 (one hop); with network device 322 via links L1 and L2 (two hops); with network device 323 via links L1, L2, and L6 (three hops); with network device 224 via links L1, L2 , L6, and L10 (four hops); with network device 325 via links L1, L2, L6, L10, and L14 (five hops); with network device 331 via links L1 and L3 (two hops); with network device 332 via links L1, L2, and L5 (three hops); with network device 333 via links L1, L2, and L8 (three hops); with network device 334 via links L1, L2, L6, L10, and L11 (five hops); with network device 335 via links L1, L2, L6, L10, L14, and L15 (six hops).

Accordingly, controller 310 considers one direct instruction plan for each of network devices 331-335 (i.e., corresponding to the logical link between controller 310 and that network device). Additionally, controller 310 considers assisted instruction plans for each of network devices 331-335.

In this example, controller 310 considers an assisted instruction plan for each of network devices 331-335 that has the preceding network device in the data path (dashed lines in FIG. 3B) as an intermediate network device. More specifically, network device 331 is the first network device in the data path and, therefore, controller 310 determines that no assisted instruction plan exists for network device 331 (or that the assisted instruction plan for network device 331 has a maximum or infinite cost).

The assisted instruction plan for network device 332 has network device 331 as an intermediate network device. Accordingly, the cost of the assisted instruction plan for network device 332 has three hops—two for the logical link (i.e., direct instruction plan) between controller 310 and network device 331, and one for link L4 between network devices 331 and 332.

The assisted instruction plan for network device 333 has network device 332 as an intermediate network device. Accordingly, the cost of the assisted instruction plan for network device 333 has four hops—three for the logical link (i.e., direct instruction plan) between controller 310 and network device 332, and one for link L7 between network devices 332 and 333.

The assisted instruction plan for network device 334 has network device 333 as an intermediate network device. Accordingly, the cost of the assisted instruction plan for network device 334 has four hops—three for the logical link (i.e., direct instruction plan) between controller 310 and network device 333, and one for link L9 between network devices 333 and 334.

The assisted instruction plan for network device 335 has network device 334 as an intermediate network device. Controller 310 determines that the assisted instruction plan for network device 335 can be determined using the direct instruction plan for network device 334 (i.e., the logical link between controller 310 and network device 334) or the assisted instruction plan for network device 334. The cost of the assisted instruction plan for network device 335 using the direct instruction plan for network device 334 has six hops—five for the logical link between controller 310 and network device 334, and one for link L12 between network devices 334 and 335. The cost of the assisted instruction plan for network device 335 using the assisted instruction plan for network device 334 has five hops—three for the logical link between controller 310 and network device 333, one for link L9 between network devices 333 and 334, and one for link L12 between network devices 334 and 335. It should be noted that for network device 335, the assisted instruction plan includes two intermediate network devices—network device 333 and network device 334. Accordingly, the assisted instruction plan for network device 335 using the assisted instruction plan for network device 334 is more efficient (here, has a fewer number of hops), and is determine by controller 310 to be the assisted instruction plan for network device 335.

Controller 310 then selects the least cost (most efficient) instruction plan for each network device in the data path from the direct instruction plan and the assisted instruction plan for that network device. In this example, for network device 331, the cost of the direct instruction plan is less than the cost of the assisted instruction plan. Accordingly, the direct instruction plan is selected for network device 331. For network device 332, the cost of the direct instruction plan is less than the cost of the assisted instruction plan.

Accordingly, the direct instruction plan is selected for network device 332. For network device 333, the cost of the direct instruction plan is the same as the cost of the assisted instruction plan. In this example, controller 310 selects the direct instruction plan if the costs are the same. Accordingly, the direct instruction plan is selected for network device 333. In other implementations, controller 310 can select the assisted instruction plan if the costs are the same. For network device 334, the cost of the direct instruction plan is more than the cost of the assisted instruction plan. Accordingly, the assisted instruction plan is selected for network device 334. For network device 335, the cost of the direct instruction plan is more than the cost of the assisted instruction plan. Accordingly, the assisted instruction plan is selected for network device 335.

Controller 310 then generates messages that will be provided to network devices in the data path for which direct instruction plans were selected. These messages will include instructions for establishing forwarding rules at the network devices in the data path for which direct instruction plans were selected, and some will also include instructions for establishing forwarding rules at the network devices in the data path for which assisted instruction plans were selected. The messages provided from controller 310 in this example are illustrated in FIGS. 3C-3E.

Figure 3C:
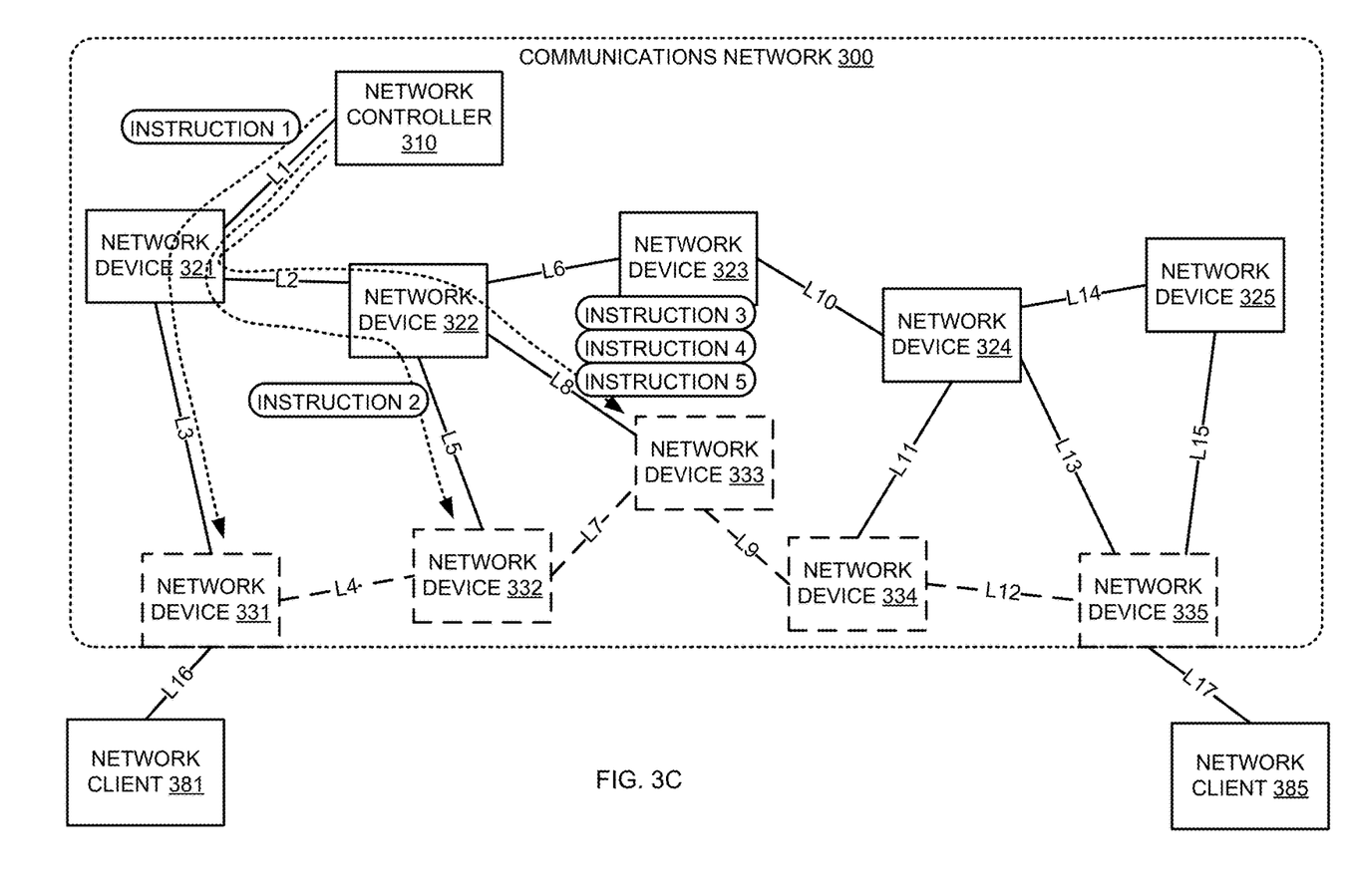
Figure 3D:
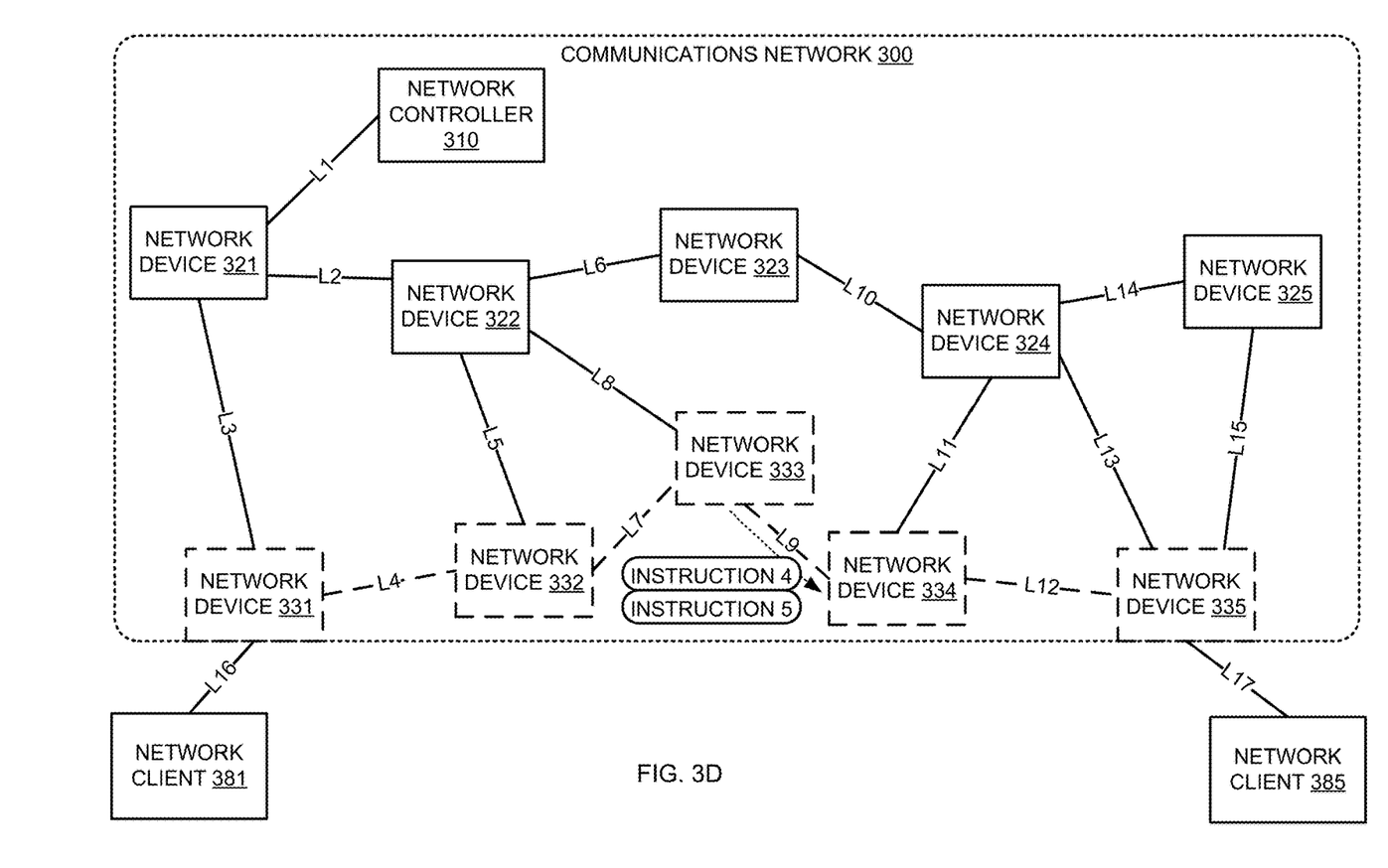
Figure 3E:
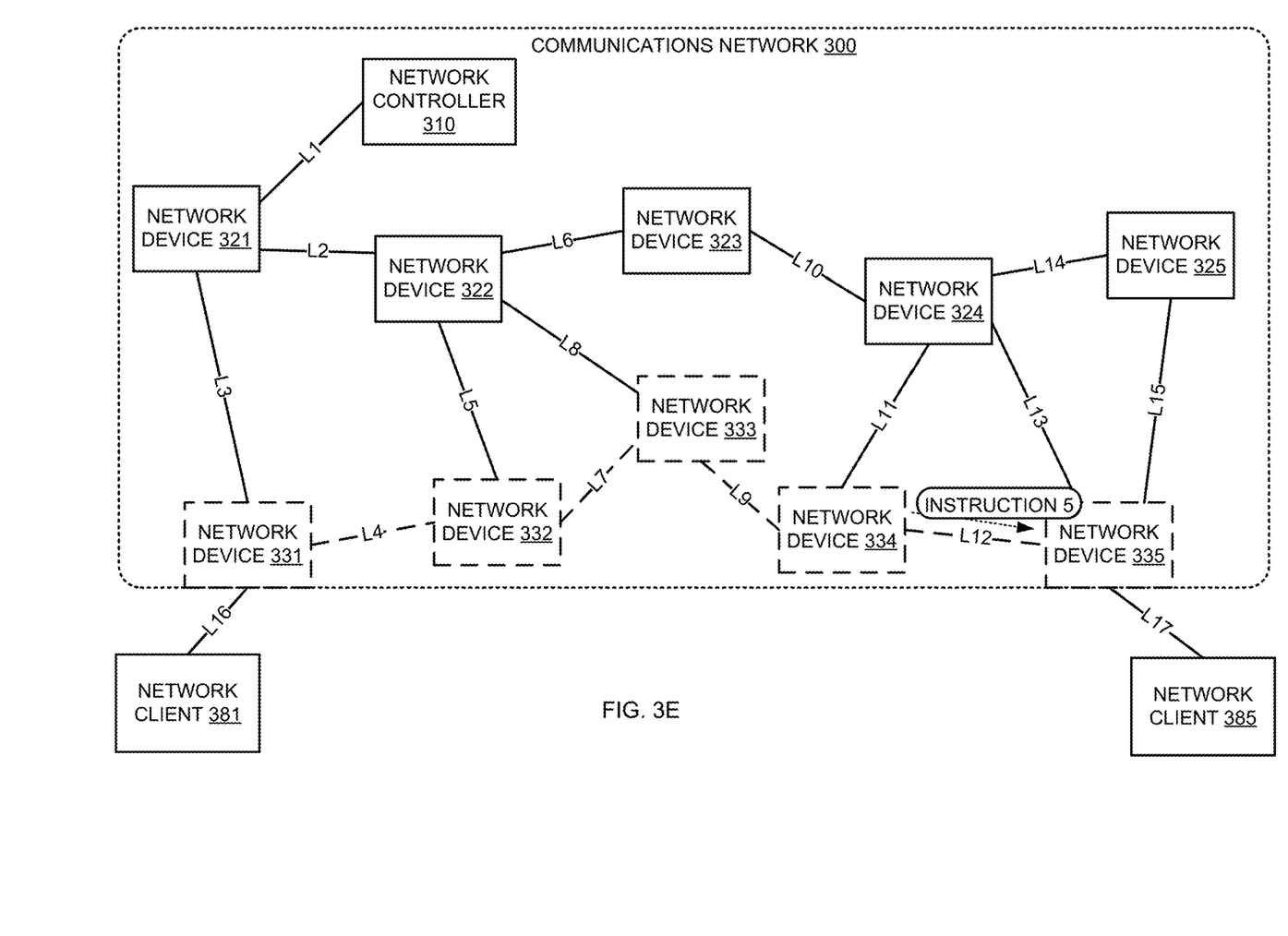

As illustrated in FIG. 3C, messages are sent to each network device in the data path for which direct instruction plans were selected. More specifically, controller 310 provides a message including an instruction to establish a forwarding rule to realize the data path for a flow at network device 331 (labeled INSTRUCTION 1) to network device 331 along the instruction plan selected for network device 331 (a direct instruction plan). Network device 331 receives this message, and establishes a forwarding rule to realize the data path at network device 331 (e.g., to forward the flow along the data path). Similarly, controller 310 provides a message including an instruction to establish a forwarding rule to realize the data path for a flow at network device 332 (labeled INSTRUCTION 2) to network device 332 along the instruction plan selected for network device 332 (a direct instruction plan). Network device 332 receives this message, and establishes a forwarding rule to realize the data path at network device 332 (e.g., to forward the flow along the data path).

Controller 310 also provides a message including an instruction to establish a forwarding rule to realize the data path for a flow at network device 333 (labeled INSTRUCTION 3) to network device 333 along the instruction plan selected for network device 333 (a direct instruction plan). This message also includes an instruction to establish a forwarding rule to realize the data path at network device 334 (labeled INSTRUCTION 4) and an instruction to establish a forwarding rule to realize the data path at network device 335 (labeled INSTRUCTION 5) to network device 335. Thus, network device is an intermediate network device of the assisted instruction plans for network devices 334 and 335.

Network device 333 receives this message, and establishes a forwarding rule to realize the data path at network device 333 (e.g., to forward the flow along the data path) based on INSTRUCTION 3. Additionally, network device 333 determines (e.g., based on identifiers of network devices 334 and 335 in INSTRUCTION 4 and INSTRUCTION 5, respectively) that the message includes instructions to establish a forwarding rule to realize the data path at network devices 334 and 335 (INSTRUCTION 4 and INSTRUCTION 5, respectively). As illustrated in FIG. 3D, network device 333 provides a message including INSTRUCTION 4 and INSTRUCTION 5 to network device 334, the following network device in the data path.

Network device 334 receives this message, and establishes a forwarding rule to realize the data path at network device 334 (e.g., to forward the flow along the data path) based on INSTRUCTION 4. Additionally, network device 334 determines (e.g., based on an identifier of network device 335 in INSTRUCTION 5) that the message includes an instruction to establish a forwarding rule to realize the data path at network device 335 (INSTRUCTION 5). As illustrated in FIG. 3E, network device 334 provides a message including INSTRUCTION 5 to network device 335, the following network device in the data path. Thus, network device is an intermediate network device of the assisted instruction plan for network device 335. Network device 335 receives this message, and establishes a forwarding rule to realize the data path at network device 335 (e.g., to forward the flow along the data path) based on INSTRUCTION 5.

Each of the network devices in the data path (network devices 331-335) now include forwarding rules to forward the flow between network clients 381 and 385 along the data path defined by controller 310. In other words, network devices 331-335 were programmed to realize the data path defined by controller 310. Network clients 381 and 385 are then able to communicate along the data path through communications network 300.

In some implementations, network devices 331-335 report to controller 310 after they have been programmed (e.g., established a forward rule to realize the data path for the flow). After each of the network device 331-335, controller 310 can provide a signal to the first network device in the data path (network device 331 in this example) to indicate that that network device can begin forwarding the flow along the data path. The signal can be, for example, a message indicating the data path had been programmed. As another example, the signal can be a message including the instruction to establish a forwarding rule to realize the data path for the flow. That is, controller 310 can provide the instruction to establish a forwarding rule to realize the data path for the flow at the first network device in the data path after all other network devices in the data path have been programmed (e.g., reported to controller 310 after they had been programmed).

Figure 4:
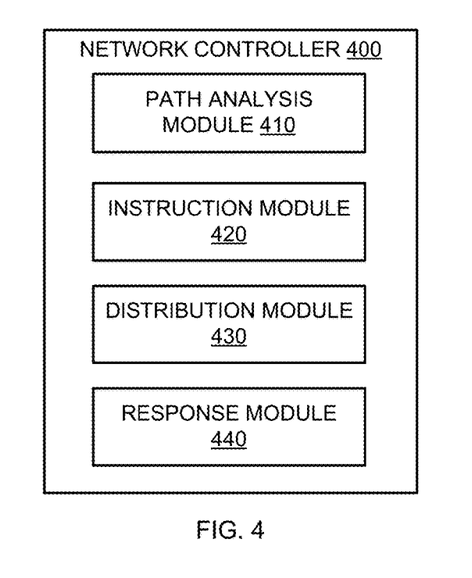
FIG. 4 is an illustration of a network controller, according to an implementation.

FIG. 4 is an illustration of a network controller, according to an implementation. As illustrated in FIG. 4, network controller 400 includes path analysis module 410, instruction module 420, distribution module 430, and response module 440. Although particular modules (i.e., combinations of hardware and software) are illustrated and discussed in relation to FIG. 4 and other example implementations, other combinations or sub-combinations of modules can be included within other implementations. Said differently, although modules illustrated in FIG. 4 and discussed in other example implementations perform specific functionalities in the examples discussed herein, these and other functionalities can be accomplished, implemented, or realized at different modules or at combinations of modules. For example, two or more modules illustrated and/or discussed as separate can be combined into a module that performs the functionalities discussed in relation to the two modules. As another example, functionalities performed at one module as discussed in relation to these examples can be performed at a different module or different modules.

Path analysis module 410 is a combination of hardware and software that defines a data path for a flow within a network in response to a data path request from a network device. For example, network controller 400 can include a description of a network (e.g., a representation of network devices and links between network devices) within a memory (not shown). Path analysis module 410 can access this description of the network to define a data path for a flow using any of a variety of methodologies such as shortest path analyses or other path finding methodologies.

Instruction module 420 is a combination of hardware and software that generates instructions to establish at network devices a forwarding rule to realize a data path for a flow defined at path analysis module 410. In other words, instruction module 420 generates instructions to program network devices to realize a data path. Instruction module 420 also determines the costs of instruction plans for programming network devices in a data path (e.g., how instructions will be provided to network devices), and selects instruction plans that will be used to program those network devices. As discussed herein, instruction module 420 selects instruction plans that will be used to efficiently (e.g., at a lowest or reduced cost) program those network devices.

Additionally, instruction module 420 generates the messages that include the instructions according to the selected instruction plan for each network device in the data path. In other words, instruction module 420 determines which instructions should be provided to which network devices to efficiently realize a data path, and generates messages to cause those instructions to be provided to the corresponding network devices according to the selected instruction plan for each network device. Said differently, instruction module 420 includes instructions for network devices for which a direct instruction plan was selected in messages directed (e.g., addressed) to those network devices. Also, instruction module 420 includes instructions for network devices for which an assisted instruction plan was selected in messages for other network devices. In some implementations, such other network devices are network devices for which a direct instruction plan was selected, as discussed above. As a specific example, in reference to FIG. 1A, instruction module 420 can implement blocks 130 and 140 of process 100.

Distribution module 430 is a combination of hardware and software that provides (e.g., transmits) messages to network devices. In other words, distribution module distributes messages to network devices based on the instruction plans selected for network devices in a data path. As a specific example, distribution module 430 can communicate with a network stack (not shown) of network controller 400.

Response module 440 is a combination of hardware and software that determines that forwarding rules to realize a data path for a flow were established at network devices in the data path. For example, response module 440 can receive responses from network devices after those network devices have established forwarding rules to realize the data path for the flow (e.g., have been programmed for the data flow). Additionally, response module can provide a signal to a network device in response to a determination that forwarding rules to realize the data path for the flow were established at network devices in the data path. For example, the signal can indicate to a first network device in the data flow that the data flow has been programmed and the flow can be forwarded along the data flow. As another example, the signal can be a message including an instruction to establish a forwarding rule associated with the flow (e.g., to establish a forwarding rule to realize the data path for the flow) at the first network device in the data flow.

Figure 5:
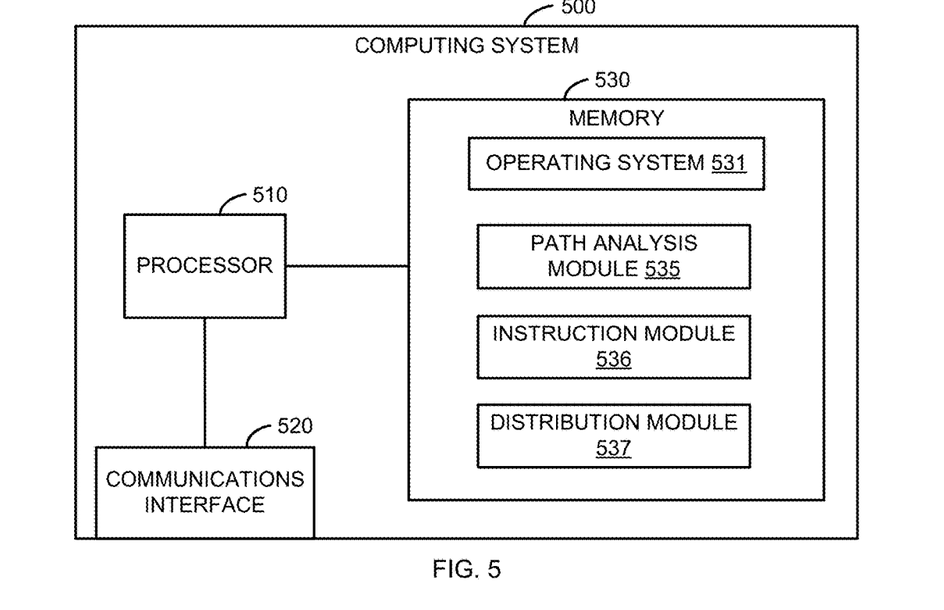
FIG. 5 is a schematic block diagram of computing device implementing a network controller, according to an implementation.

FIG. 5 is a schematic block diagram of computing system implementing a network controller, according to an implementation. As illustrated in FIG. 5, computing system 500 includes processor 510, communications interface 520, and memory 530. Processor 510 is any combination of hardware and software that executes or interprets instructions, codes, or signals. For example, processor 510 can be a microprocessor, an application-specific integrated circuit (ASIC), a graphics processing unit (GPU) such as a general-purpose GPU (GPGPU), a distributed processor such as a cluster or network of processors or computing systems, a multi-core or multi-processor processor, a virtual or logical processor, or some combination thereof. As a specific example, in some implementations, processor 510 can include multiple processors such as one or more general purpose processors and one or more ASICs.

Communications interface 520 is a module via which processor 510 can communicate with other processors or computing systems via a communications link. As a specific example, communications interface 520 can include a network interface card and a communications protocol stack hosted at processor 510 (e.g., instructions or code stored at memory 530 and executed or interpreted at processor 510 to implement a network protocol) to receive data from and send data to resource authorities. As specific examples, communications interface 520 can be a wired interface, a wireless interface, an Ethernet interface, a Fiber Channel interface, an InfiniBand interface, an IEEE 802.11 interface, or some other communications interface via which processor 510 can exchange signals or symbols representing data to communicate with other processors or computing systems.

Memory 530 is one or more processor-readable media that store instructions, codes, data, or other information. As used herein, a processor-readable medium is any medium that stores instructions, codes, data, or other information non-transitorily and is directly or indirectly accessible to a processor. Said differently, a processor-readable medium is a non-transitory medium at which a processor can access instructions, codes, data, or other information. For example, memory 530 can be a volatile random access memory (RAM), a persistent data store such as a hard-disk drive or a solid-state drive, a compact disc (CD), a digital versatile disc (DVD), a Secure Digital™ (SD) card, a MultiMediaCard (MMC) card, a CompactFlash™ (CF) card, or a combination thereof or of other memories. In other words, memory 330 can represent multiple processor-readable media. In some implementations, memory 530 (or some portion thereof) can be integrated with processor 510, separate from processor 510, and/or external to access point 500.

Memory 530 includes instructions or codes that when executed at processor 510 implement operating system 531, path analysis module 535, instruction module 536, distribution module 537, and/or other modules. Thus, instructions or codes stored at memory 530 and/or executed (or interpreted) by processor 510 can be referred to as modules. A processor implements a module by performing functionalities, processes, or actions associated with that module. Memory 530 is also operable to store additional codes or instructions to implement other modules not illustrated in FIG. 5 such as a response module and/or other data sets such as a description of one or more networks.

Path analysis module 535, instruction module 536, and distribution module 537 can be referred to as a network controller. Moreover, in some implementations, computing system 500 hosting path analysis module 535, instruction module 536, and distribution module 537 can itself be referred to as a network controller.

Path analysis module 535, instruction module 536, and distribution module 537 can be accessed or installed at computing system 500 from a variety of memories or processor-readable media or via a communications network. For example, computing system 500 can access path analysis module 535, instruction module 536, and/or distribution module 537 at a remote processor-readable medium via a communications interface 520. As a specific example, computing system 500 can be a network-boot device that accesses operating system 531, path analysis module 535, instruction module 536, and/or distribution module 537 during a boot process (or sequence). As yet another example, computing system 500 can include (not illustrated in FIG. 5) a processor-readable medium access device (e.g., a CD or DVD drive or a CF or SD card reader) to access a processor-readable medium storing path analysis module 535, instruction module 536, and/or distribution module 537.

As used herein, the term "module" refers to a combination of hardware (e.g., a processor such as an integrated circuit or other circuitry) and software (e.g., programming such as machine- or processor-executable instructions, commands, or code such as firmware, programming, or object code). A combination of hardware and software includes hardware only (i.e., a hardware element with no software elements such as an ASIC), software hosted at hardware (e.g., software that is stored at a processor-readable memory such as RAM, a hard-disk or solid-state drive, resistive memory, or optical media such as a DVD and/or executed or interpreted at a processor), or hardware and software hosted at hardware.

Additionally, as used herein, the singular forms "a," "an," and "the" include plural referents unless the context clearly dictates otherwise. Thus, for example, the term "module" is intended to mean one or more modules or a combination of modules. Moreover, the term "provide" as used herein includes push mechanisms (e.g., sending data to a computing system or agent via a communications path or channel), pull mechanisms (e.g., delivering data to a computing system or agent in response to a request from the computing system or agent), and store mechanisms (e.g., storing data at a data store or service at which a computing system or agent can access the data). Furthermore, as used herein, the term "based on" means "based at least in part on." Thus, a feature that is described as based on some cause, can be based only on the cause, or based on that cause and on one or more other causes.

While certain implementations have been shown and described above, various changes in form and details may be made. For example, some features that have been described in relation to one implementation and/or process can be related to other implementations. In other words, processes, features, components, and/or properties described in relation to one implementation can be useful in other implementations. As another example, functionalities discussed above in relation to specific modules or components can be included at different modules, engines, or components in other implementations. Furthermore, it should be understood that the systems, apparatus, and methods described herein can include various combinations and/or sub-combinations of the components and/or features of the different implementations described. Thus, features described with reference to one or more implementations can be combined with other implementations described herein.

What is claimed is:

1. A network controller, comprising:
   a path analysis module to define a data path for a flow within a network in response to a data path request from a network device, the data path including a plurality of network devices; and
   determine a cost of a direct instruction plan between the network controller and each network device from the plurality of network devices and a cost of an assisted instruction plan between the network controller and each network device from the plurality of network devices;
   an instruction module to:
   generate a first message including an instruction to establish a first forwarding rule associated with the flow at a first network device from the plurality of network devices in response to the cost of the direct instruction plan between the network controller and the first network device being less than the cost of the assisted instruction plan between the network controller and that network device; and
   generate a second message including a first instruction to establish a second forwarding rule associated with the flow at a second network device from the plurality of network devices and a second instruction to establish a third forwarding rule associated with the flow at a third network device from the plurality of network devices in response to the cost of the direct instruction plan between the network controller and the third network device being greater than the cost of the assisted instruction plan between the network controller and the third network device; and
   a distribution module to:
   provide the first message to the first network device and to provide the second message to the second network device along the assisted instruction plan.

2. The network controller of claim 1, wherein the instruction module is configured select an instruction plan between the network controller and each network device from the plurality of network devices and to generate the first message and the second message based on a lowest cost instruction plan for each of the first network device, the second network device, and the third network device.

3. The network controller of claim 1, wherein the instruction module selects an instruction plan between the network controller and the third network device that includes the second network device.

4. The network controller of claim 1, further comprising:
   a response module to determine that the first forwarding rule is established at the first network device, the second forwarding rule is established at the second network device, and the third forwarding rule is established at the third network device and to provide a signal to the network device in response to the determination that the first forwarding rule is established at the first network device, the second forwarding rule is established at the second network device, and the third forwarding rule is established at the third network device.

5. The network controller of claim 1, further comprising:
   a response module to determine that the first forwarding rule is established at the first network device, the second forwarding rule is established at the second network device, and the third forwarding rule is established at the third network device and to provide a message including an instruction to establish a forwarding rule associated with the flow at the network device in response to the determination that the first forwarding rule is established at the first network device, the second forwarding rule is established at the second network device, and the third forwarding rule is established at the third network device.

6. The network controller of claim 1, wherein:
the instruction included in the first message includes a match field having a value;
the first instruction included in the second message includes a match field having the value; and
the second instruction included in the second message includes a match field having the value.

7. A network programming method, comprising:
determining a cost of a direct instruction plan between a network controller and each network device from the plurality of network devices and a cost of an assisted instruction plan between the network controller and each network device from the plurality of network devices;
generating, with network controller, a first message including an instruction to establish a first forwarding rule associated with the flow at a first network device from the plurality of network devices in response to the cost of the direct instruction plan between the network controller and a first network device from the plurality of network devices being less than the cost of the assisted instruction plan between the network controller and the first network device;
generating, with network controller, a second message, including a first instruction to establish a second forwarding rule associated with the flow at a second network device from the plurality of network devices and a second instruction to establish a third forwarding rule associated with the flow at a third network device from the plurality of network devices in response to the cost of the direct instruction plan between the network controller and the third network device from the plurality of network devices being greater than the cost of the assisted instruction plan between the network controller and the third network device;
provide the first message to the first network device and to provide the second message to the second network device along the assisted instruction plan;
receiving, with the second network device, the second message from the network controller including the first instruction to establish the second forwarding rule associated with a flow at the second network device and the second instruction to establish the third forwarding rule associated with the flow at the third network device;
establishing the second forwarding rule at the second network device; and
providing the second message including the third instruction to the third network device.

8. The method of claim 7, wherein the first message is received at the first network device.

9. The method of claim 7, wherein the second network device immediately precedes the third network along a data path of the flow.

10. The method of claim 7, wherein a selected instruction plan between the network controller and the third network device includes the second network device.

11. The method of claim 7, further comprising:
providing, before the receiving, a data path request to the network controller.

12. The method of claim 7, wherein the second forwarding rule is established at the second network device before the second message including the third instruction is provided to the third network device.

13. A non-transitory processor-readable medium storing code representing instructions that when executed at a processor cause the processor to:
define a data path for a flow within a network in response to a data path request from a network device, the data path including a plurality of network devices;
determine a cost of a direct instruction plan between the network controller and each network device from the plurality of network devices and a cost of an assisted instruction plan between the network controller and each network device from the plurality of network devices;
generate a first message including an instruction to establish a first forwarding rule associated with the flow at a first network device from the plurality of network devices in response to the cost of the direct instruction plan between the network controller and a first network device from the plurality of network devices being less than the cost of the assisted instruction plan between the network controller and the first network device;
generate a second message including a first instruction to establish a second forwarding rule associated with the flow at a second network device from the plurality of network devices and a second instruction to establish a third forwarding rule associated with the flow at a third network device from the plurality of network devices in response to the cost of the direct instruction plan between the network controller and the third network device from the plurality of network devices being greater than the cost of the assisted instruction plan between the network controller and the third network device; and
provide the first message to the first network device and to provide the second message to the second network device along the assisted instruction plan.

14. The non-transitory processor-readable medium of claim 13, wherein, in response to the cost of the direct instruction plan between the network controller and a fourth network device from the plurality of network devices being greater than the cost of the assisted instruction plan between the network controller and the fourth network device, the instruction to establish a forwarding rule at the third network device is included within a message provided to the other device, the message including an instruction to establish a forwarding rule at the other network device.

15. The non-transitory processor-readable medium of claim 13, wherein, in response to the cost of the direct instruction plan between the network controller and a network device from the plurality of network devices being greater than the cost of the assisted instruction plan between the network controller and network device, the assisted instruction plan includes the other network device.

16. The network controller of claim 1, wherein the first instruction to establish the second forwarding rule at the second network device comprises instructions directing the second network device to write the second forwarding rule to a forwarding table at the second network device, wherein the second forwarding rule applies to a flow received by the second network device independent of the second message.

17. The method of claim 7, wherein the third instruction to establish the third forwarding rule associated with the flow at the third network device comprises instructions to write the third forwarding rule associated with the flow to a forwarding table of the third network device.

18. The method of claim 7 further comprising applying the third forwarding rule to the flow at the third network device, the flow being received independent of the second message.

* * * * *